Nov. 21, 1939.   L. LEE   2,180,532
AIR HEATING SYSTEM
Filed Dec. 18, 1936   5 Sheets-Sheet 1

INVENTOR.
LEIF LEE
BY Francis J. Klempay
ATTORNEY

Nov. 21, 1939.　　　　　　L. LEE　　　　　　2,180,532
AIR HEATING SYSTEM
Filed Dec. 18, 1936　　　5 Sheets—Sheet 2
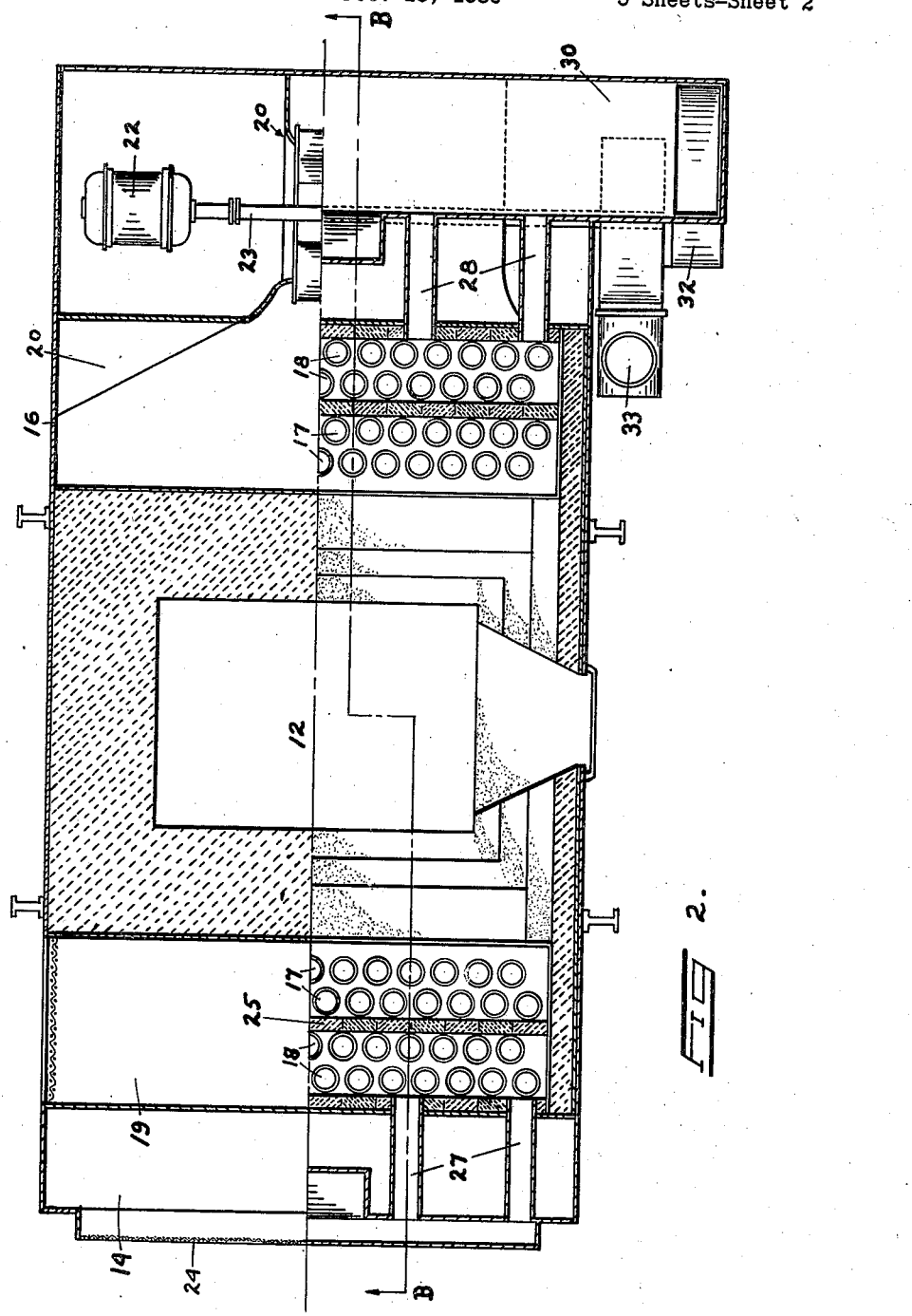
INVENTOR.
LEIF LEE
BY
Francis J. Klempay
ATTORNEY Nov. 21, 1939.     L. LEE     2,180,532
AIR HEATING SYSTEM
Filed Dec. 18, 1936     5 Sheets-Sheet 3
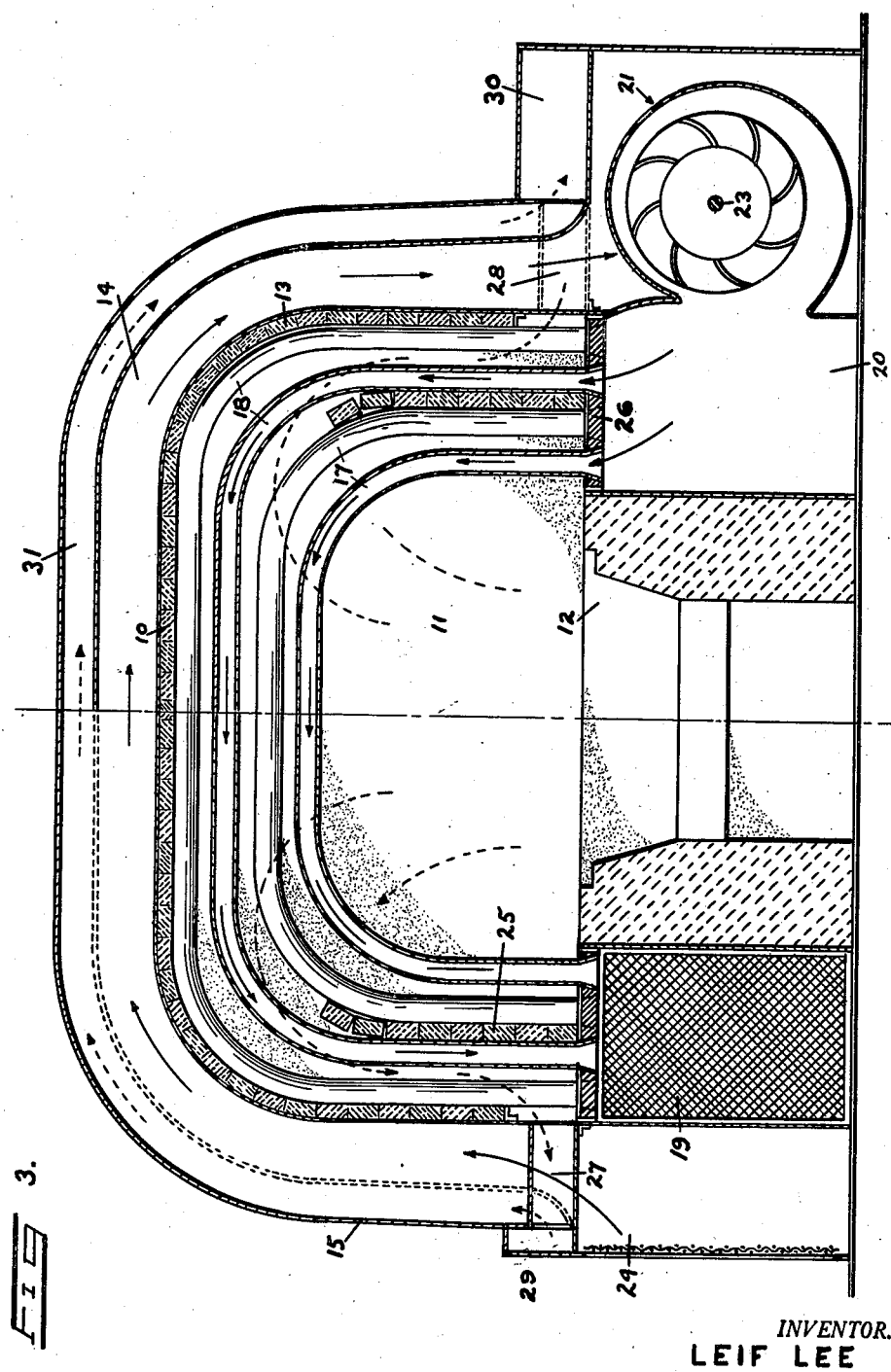
INVENTOR.
LEIF LEE
BY
*Francis J. Klempay*
ATTORNEY

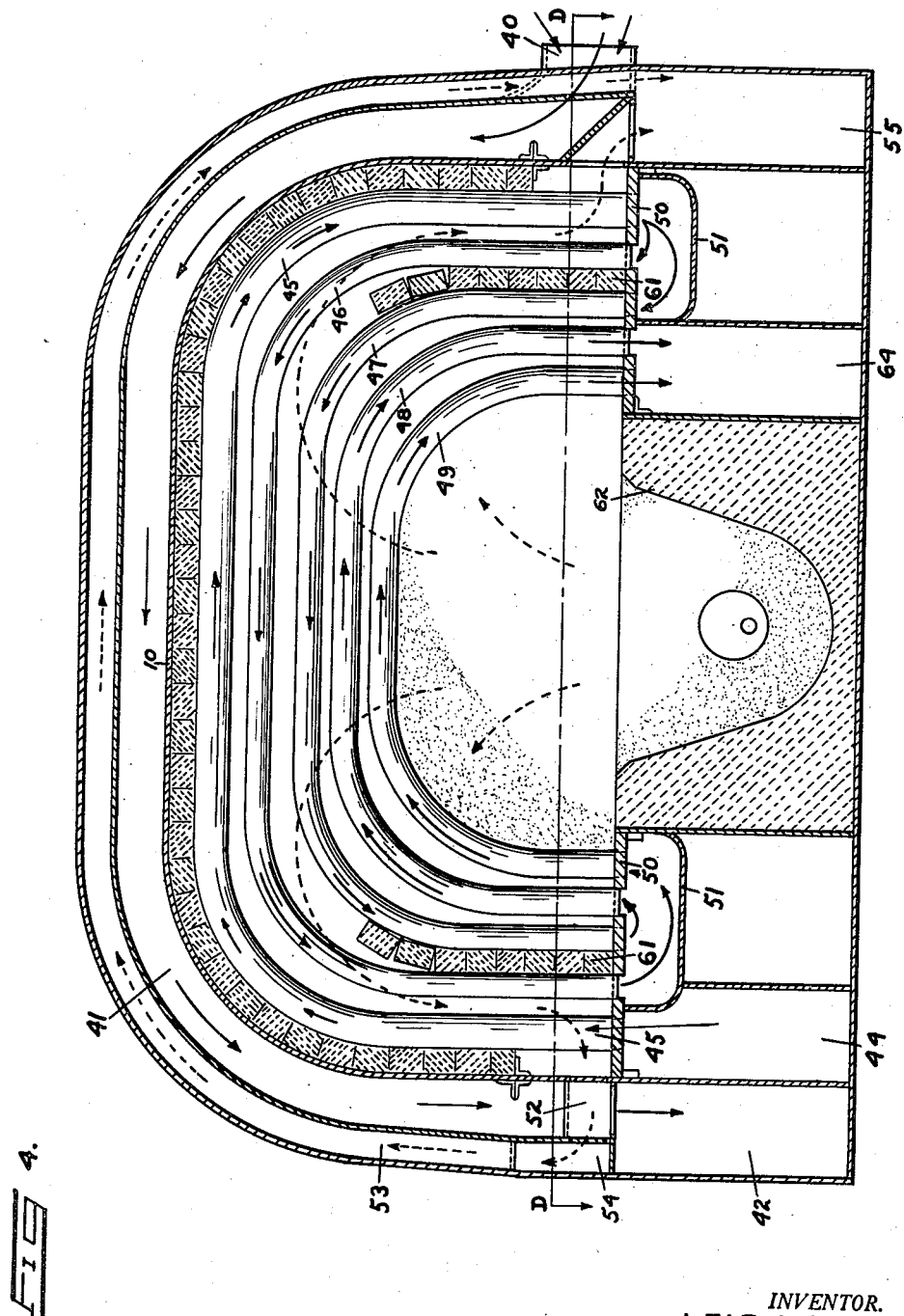

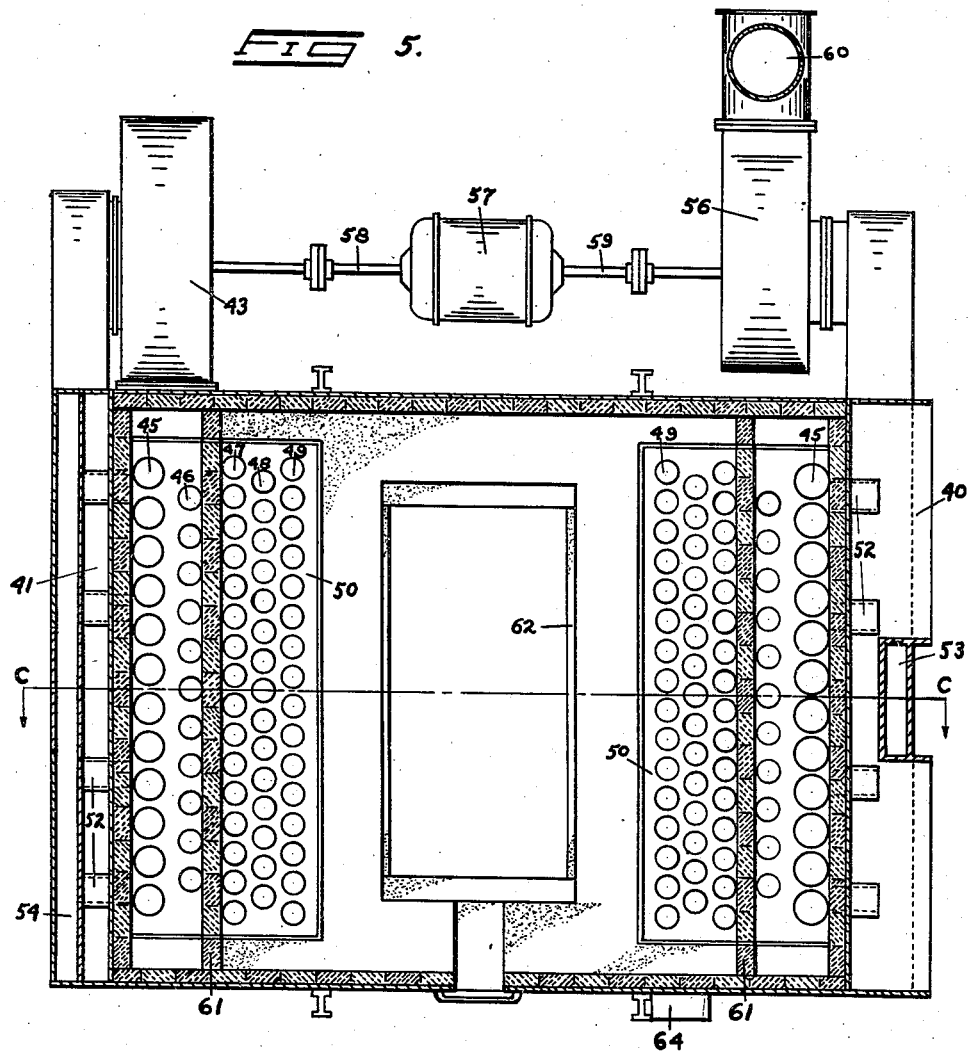

Patented Nov. 21, 1939

2,180,532

UNITED STATES PATENT OFFICE 2,180,532

AIR HEATING SYSTEM

Leif Lee, Youngstown, Ohio; Halfdan Lee executor of the estate of said Leif Lee, deceased Application December 18, 1936, Serial No. 116,523

8 Claims. (Cl. 126—110)

This invention relates to a furnace and more particularly to a furnace capable of heating economically large volumes of air. The subject matter of the present invention constitutes improvements in the heating system disclosed and claimed in my prior U. S. Patent No. 1,768,086.

In a heating system of the type under consideration the efficiency is determined along with other factors by the distribution and flow of the hot gaseous products of combustion in relation to the heat exchange surfaces and by the temperature differential maintained between the gases and the heat exchange surfaces or the air beyond the surfaces. To prevent substantial stack losses the temperature of the gases as they leave the furnace must be reduced to a low value. I overcome the problem of these conflicting requirements by dividing the combustion chamber of the furnace into a high temperature zone and a low temperature zone, the function of the high temperature zone being to provide an unusually high differential between the temperature of the gaseous products of combustion and a portion of the heat exchange surface and the function of the low temperature zone being to extract a high percentage of the heat from the gases whereby the temperature of the flue gases leaving the furnace will be low.

In the furnace disclosed in my prior patent as in the present construction the combustion chamber is provided with an insulated roof and heating ducts are disposed both internally and externally of the roof. The internal ducts are in the form of arched tubes spanning the combustion chamber and are preferably arranged in series, variably spaced radially from the center of the combustion space. An increased number of series of tubes is utilized to increase the capacity of the furnace and since the tubes closer to the center of the combustion space are materially shorter than the tubes further away, the frictional resistance to air flow through the tubes is greater in the outer tubes than in the inner tubes. Consequently the rate of flow of the air being heated is greater through the shorter inner tubes than in the longer outer tubes and the air is in contact with the heat exchanging surfaces for a shorter interval of time. This results in unequal temperatures of the air leaving the various tubes and an impairment of the efficiency of the furnace. By employing suitable means to maintain the temperature about the shorter tubes at a much higher value than the temperature about the longer tubes I am enabled to compensate for the variation of the rate of flow of the air through the various tubes and to secure a substantially uniform temperature at the outlet of each tube.

Accordingly, the primary object of this invention is to provide in a furnace of the kind described suitable means for dividing the combustion space into a plurality of zones having varying temperatures whereby certain of the heat exchanging elements may be positioned in one zone and other of the elements may be located in another zone for the purpose or purposes described.

Another object of this invention is to provide improved means for distributing and lengthening the flow of the hot gaseous products of combustion throughout the heat exchanging surfaces of the furnace.

A further object of the invention is to provide means in a furnace of the kind described whereby but a portion of the tubes need be of special alloy steel to withstand high temperatures in the event that unusually high combustion temperatures be employed.

These and other objects and advantages of the invention will become apparent from a consideration of the drawings and the following detailed specification.

In the drawings:

Figure 2 is a cross-sectional plan view of the furnace, taken along the line A—A of Figure 1.

Figure 3 is a cross-sectional view of the furnace, taken along the line B—B of Figure 2.

Figure 4 is a cross-sectional view of a modification of the invention, taken along the line C—C of Figure 5.

Figure 5 is a plan sectional view of the furnace of Figure 4 taken along the line D—D of Figure 4.

Figure 1:
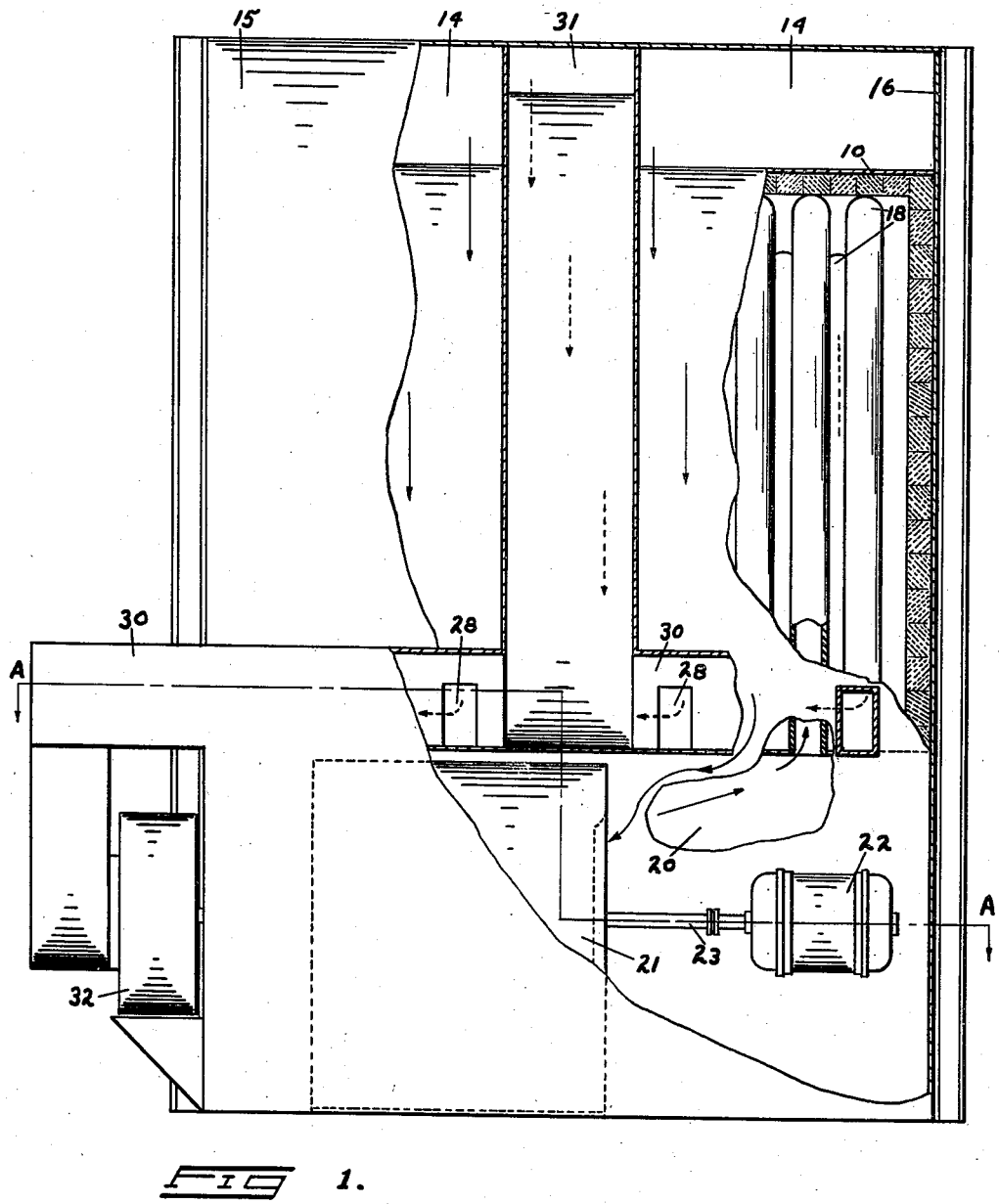
Figure 1 is a right end elevation of a preferred embodiment of the invention with certain elements broken away.

As disclosed in my prior U. S. Patent No. 1,768,086, the furnace consists generally of an arched casing 10 defining a combustion chamber 11 in which is placed the refractory lined retort 12 in which may be burned solid, liquid or gaseous fuels. The inner surface of the casing 10 is lined with suitable refractory or insulating brick 13 to prevent burning of the casing and excessive loss of heat by radiation. The casing 10 constitutes one wall of an air duct 14, the outer casing 15 and suitable end pieces 16 forming the other walls of the duct.

A plurality of tubes 17, 18, bent to conform to the shape of the roof of the combustion chamber are arranged within the combustion chamber to span the retort 12. The outer series of tubes may engage and aid in supporting the refractory lined roof of the combustion chamber. The open left ends of the tubes are in communication with a common duct 19 which leads to outside the furnace. The open right ends of the tubes communicate with the duct 20. Between duct 14 and duct 20 is positioned the air circulating means which in the embodiment illustrated is a centrifugal blower 21 driven by motor 22 through shaft 23. The function of the blower 21 is to draw air through the inlet 24 and duct 14 and force it into the header 20 through tubes 17, 18 and out of the furnace through duct 19.

To secure a better distribution of the hot gaseous products of combustion so that they may contact more surface of the heat exchanging device and to maintain a higher temperature at a portion of the heat exchanging device, I provide the walls 25 of insulating material within the combustion chamber. In the embodiment illustrated in Figures 1–3, I provide four series of tubes and the insulating walls 25 are positioned so as to place two series of the tubes outside the walls and the remaining two series between the walls and the retort. As shown the walls are parallel and extend the entire width of the combustion chamber, being supported on the header plates 26. A plurality of small ducts 27 extend laterally from the combustion chamber immediately above the header plate 26 and discharge into the header duct 29 which extends along the left side of the furnace as viewed in Figure 3. Similarly the ducts 28 discharge into the header duct 30 on the right side of the furnace. A cross duct 31 housed within the air duct 14 connects the left flue duct 29 with the right flue duct 30. A second blower 32 also driven by shaft 23 and motor 22 is operative to draw the products of combustion from the combustion chamber, laterally through ducts 27 and 28, into the common duct 30 and then force them up the stack 33.

The operation of the furnace thus far described should be apparent. The gaseous products of combustion issuing from the retort 12 are drawn upwardly and outwardly and are caused to move into the upper region of the inner air tubes 17 by the baffle walls 25. The gases then move over the wall and pass downwardly along the vertical portions of the outer tubes 18 and into the ducts 27 and 28. The walls 25 cause the gases to flow along the tubes 17 and 18 for a major portion of their length, which feature is highly advantageous in that the efficiency of the heating system is thereby enhanced. The insulating walls 25 by effectively blocking radiation from the combustion in the retort is operative to provide a zone of high temperature between the walls and another zone of lower temperature between the walls and the casing 10. A high temperature differential is thus maintained between different zones of the combustion chamber. With this construction I am enabled to economically employ higher temperatures in the combustion chamber since it is then necessary to use chrome steel or other alloy having a high oxidation temperature only for the inner tubes 17 while common inexpensive steel may be used for the outer tubes 18. It should be noted that the inner tubes 17 are considerably shorter than the outer tubes 18 and that therefore less material is required for their manufacture. This feature is of importance in large installations utilizing extremely high combustion temperatures as the use of steel alloys having good oxidation resistive characteristics for all the tubes throughout such large installation is prohibitive in cost.

The zoned construction of the combustion chamber enables an unusually high temperature differential to be maintained between the air passing through the tubes 17 and the gases surrounding them. This necessarily results in a high rate of heat transfer since the heat conducted is directly proportional to the temperature gradient. This also compensates for the decreased length of and consequent higher rate of air flow through the shorter tubes 17, thus providing a substantially uniform discharge temperature for each tube. The rapid heat transfer to the tubes 17, the flow of the cooler gases along the longer outer tubes 18 and uniform discharge temperatures all unite to provide a highly efficient air heating system having a large capacity but requiring only moderately sized equipment.

Figures 4 and 5 illustrate a modified form of furnace embodying the features of the present invention. Instead of providing for but two passes of the air to be heated through the furnace, this modification provides for four passes of the air through the furnace. Air enters the furnace through the inlets 40 and passes over the arched roof 10 of the combustion chamber through the duct 41 which corresponds to the duct 14 of Figures 1–3. It then enters the duct 42 which is in communication with the inlet of the blower 43, the blower discharging into the duct 44 positioned beneath the left ends of the large outer tubes 45. As disclosed above, the outer tubes may be in contact with the roof of the combustion chamber and aid in supporting the same. Four sets of smaller tubes 46 to 49 are provided within the outer tubes and all the tubes have their ends welded or otherwise suitably secured in openings in the two tube headers 50. The path of travel of the air through the tubes is clearly indicated by the arrows on Figure 4 of the drawings. Air deflectors 51 secured to the tube headers 50 are provided to guide the flow of air through the tubes.

In the device of Figures 4 and 5 the products of combustion are exhausted from the combustion chamber by spaced ducts 52 positioned on opposite sides of the chamber immediately above the tube headers 50, the arrangement being similar to that in the device of Figures 1–3. The connecting duct 53 which is in communication with the left header 54 and common right flue header 55 is placed outside the air duct 41 so as not to diminish the capacity of the duct 41. An exhausting fan 56 having its inlet in communication with the common header 55 is operative to draw the products of combustion from the furnace and force them up the stack 60. Both the exhausting fan 56 and the blower 43 are driven by the motor 57, shafts 58 and 59 providing the connecting means.

As shown, the walls 61 of insulating material are supported on the tube headers 50 and extend entirely across the combustion chamber and are so positioned that the set of large outer tubes and one set of the smaller tubes are positioned outside the walls, the remaining three sets of tubes being entirely between the walls. It should be noted that here too the combustion chamber is divided into a plurality of zones of different temperatures and that the tubes within the high temperature zone are considerably shorter than the other tubes.

The path of travel of the air through the passages of the furnace is such that the incoming air is taken first through the outer passage and then progressively through the passages or tubes closer to the retort 62 or region of highest temperature. The result is that a temperature differential sufficient to support a transfer of heat is provided throughout the entire length of the passage, thus insuring a high overall rate of heat transfer and high efficiency of the system. As in the device of Figures 1–3, the insulating baffles 61 maintain a region of high temperature in the combustion chamber imparting a rapid delivery of heat to the air during its last pass in the furnace.

Having thus described my invention, I claim:

1. An air heating furnace comprising a combustion chamber having spaced side walls and an arched roof, heating ducts comprising inverted U-shaped tubes positioned within said chamber and conforming to the curvature of the roof, a retort positioned in the center of said chamber between the vertical portions of said tubes, an insulating baffle wall extending between said side walls at either end of said chamber, said walls so positioned that the vertical portions of certain of said tubes are between the walls and the outer end walls of the chamber, the vertical portions of the other of the tubes being positioned between said walls and the retort, means forcing air through said tubes, and means to draw off the products of combustion from said chamber comprising a plurality of laterally and evenly spaced ducts connecting with the end walls of the chamber in a common horizontal plane adjacent the bases of the insulating baffle walls.

2. An air heating furnace comprising a chamber having spaced side walls and an arched roof, heating ducts comprising a series of nested inverted U-shaped tubes positioned within said chamber and spanning the lower central portion thereof, the arrangement being such that the inner of said tubes are shorter in length than the outer of said tubes, means at the lower central portion of the chamber to heat the chamber, insulating baffle walls dividing the vertical portions of the inner and outer tubes, means to force air through said tubes, means to draw heating gases from the lower central portion of the chamber over the said baffle walls and down the outer surfaces thereof whereby the space within said baffle walls is maintained at a higher temperature than the spaces outside said walls, the shorter tubes being wholly within said first mentioned space and having a higher oxidation temperature than that of the longer tubes.

3. An air heating furnace comprising a combustion chamber having a pair of spaced parallel side walls and an inverted U-shaped casing section positioned between said walls forming the end walls and roof of the chamber, a retort positioned in the lower central portion of the chamber, an air duct at each end of said retort and extending between the side walls, a header plate above each of said ducts adapted to receive the open ends of a series of inverted U-shaped tubes positioned within said chamber and spanning the retort, an insulating baffle wall supported on each of said header plates spaced from the end walls and extending between said side walls, the vertical portions of certain of said tubes being positioned between the baffle walls and the said end walls, the vertical portions of the other of said tubes being positioned between the baffle walls and the retort, means to force air through said tubes from one duct to the other and means for drawing off the products of combustion comprising a plurality of laterally spaced ducts connecting with the end walls of the chamber at points immediately above the upper surface of the header plates.

4. An air heating furnace comprising spaced side walls and an arched roof, an air duct disposed externally of said roof, a retort positioned in the lower central portion of the chamber defined by the walls and roof, a tube header positioned at each side of said retort and adapted to receive the open ends of nested inverted U-shaped tubes housed within the chamber, an insulating baffle wall supported on each header, the vertical portions of certain of said tubes positioned on the sides of said baffle walls remote from said retort, the vertical portions of the other of said tubes positioned between the retort and the baffle walls, air deflecting means beneath said headers operative to direct air moving through said tubes to traverse said tubes in series, beginning with the outer of said tubes and progressing inwardly to the inner of said tubes adjacent the retort, and means to draw air through said duct and then force it through said tubes.

5. A center fired air heating furnace comprising an insulated combustion chamber, a plurality of nested series of inverted U-shaped air conducting tubes within said chamber and spanning the lower central portion thereof, insulating baffle walls separating the vertical portions of the tubes of the outer series from the vertical portions of the tubes of the inner series whereby the shorter inner tubes are subjected to higher temperatures than the longer outer tubes to compensate for the greater frictional resistance to air flow in the longer outer tubes, spaced flue ducts in opposed walls of said chamber opposite the lower portions of said baffle walls whereby the products of combustion from said lower central portion are caused to move along the vertical portions of the outer tubes after contacting the inner tubes.

6. An air heating furnace comprising a combustion chamber having side walls and a roof, air heating ducts disposed internally and externally of said roof, spaced flue ducts in the lower portions of opposed side walls of the chamber, a header extending along each of the opposed side walls and communicating with adjacent ducts, a duct within said external air duct connecting the said headers, a stack and means connecting one of said headers with the stack.

7. An air heating furnace comprising a combustion chamber, a retort positioned centrally of said chamber and adapted to emit heating gases, a plurality of series of air ducts positioned within said chamber and spanning said retort, said ducts being provided with vertically extending portions on either of the sides of said retort, an insulating baffle wall extending between certain of said series of ducts in the region of said vertically extending portions, means to circulate air through said ducts, and means to draw off heating gases from said chamber at points on the side of said wall opposite said retort and below the upper end of said wall.

8. An air heating furnace comprising a combustion chamber, a retort in said chamber adapted to emit heating gases, a plurality of series of air conducting conduits in said chamber having vertically extending portions positioned on either of the sides of said retort, bends in said conduits above said vertically extending portions, said series being progressively further removed from said retort, an insulating baffle wall between certain of said series in the region of said vertically extending portions and extending upwardly into the region of said bends, means to circulate air through said ducts, and means to draw off the heating gases from said chamber at points on the side of said wall opposite said retort and below the upper end of said wall whereby said bends will be subjected to a concentrated flow of heating gases and portions of the conduits of certain of said series will be subjected to a higher temperature than portions of the conduits of other of said series.

LEIF LEE.